Dec. 11, 1956   P. F. VON PECHMANN   2,773,694
DEVICE FOR AUTOMATIC LATHES TO FEED AND HOLD WORK
Filed Oct. 2, 1953

INVENTOR
Paul Freiherr Von Pechmann
BY
Richard Low 2,773,694

DEVICE FOR AUTOMATIC LATHES TO FEED AND HOLD WORK

Paul Freiherr von Pechmann, Koln, Germany, assignor to Alfred H. Schutte, Koln-Deutz, Germany, a German company Application October 2, 1953, Serial No. 383,832

Claims priority, application Germany November 13, 1952

4 Claims. (Cl. 279—51)

This invention relates to automatic lathes, and more particularly, to a device for such lathes to feed and hold long work.

As for the working of rods or similarly shaped work, attempts have always been made to reduce the amount of scrap which is due to the fact that a certain end portion of a rod or a piece of rodlike work cannot be worked any longer. The primary object of my invention is to render the working of long work more economical.

In automatic lathes of conventional design, rods are fed forward by means of a feed chuck which is mounted on the forward end of a feed slide. While being machined, the rod is held in a collet chuck. With each feed movement, the feed chuck slides forward to a point closely behind the effective draw-in region of the collet chuck. When the end of a rod is approached, the feed chuck pushes the end portion ahead, and this end portion may once more be drawn in by the collet chuck until finally the very last piece is ejected with no work done on it.

The length of such last pieces on which no work is done depends on the length of the draw-in or clamping surface of the collet chuck, as well as the distance of the tool from the front face of the collet chuck. To this length, a small amount must be added since the feed chuck cannot be advanced so far as to actually contact the jaws of the collet chuck.

It is an object of my invention to reduce the remaining lengths of rods, which could not be worked up to now, and which lengths were, therefore, lost, without, however, reducing the length of the draw-in region within the collet chuck. The latter length will be maintained.

In accordance with the present invention, the above and other objects and advantages are obtained by providing the feed chuck with extension members which participate in the task of drawing in and holding the rod, and which register from the rear with corresponding recesses in the collet chuck jaws. Thus, the work is held along a portion of its length both by the feed chuck and the collet chuck.

In order that my invention may be fully understood, an illustrative embodiment thereof is hereinafter described in detail and shown in the accompanying drawing in which.

Figure 1:
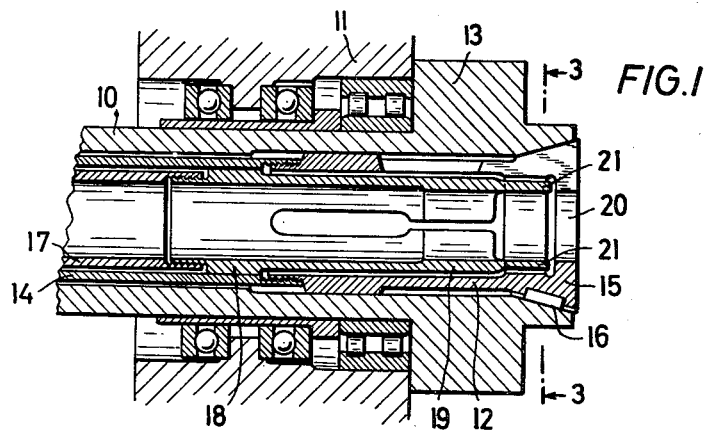
Fig. 1 is a section taken in elevation through the device according to the invention.

Referring to the drawing, in the work spindle 10 of an automatic single or multiple spindle lathe or of a turret lathe, which work spindle is rotatably mounted in the support 11, the work is held by the collet chuck 12. The work is caused to be clamped by the collet chuck by pulling back the tube 14. The collet chuck is located within the spindle nose 13. Due to the cone 15 engaging the slanted surface 16 of the spindle nose 13, the slotted chuck will be tightened and will clamp the work. After the work has been machined, the collet chuck 12 is opened by pushing the tube 14 forward. Then, the feed tube 17 which carries the feed chuck 18 is moved forward. The jaws 19 of the feed chuck 18 take the work along and drive it forward a predetermined amount into the working area. By withdrawing the tube 14, the collet chuck 12 will be closed before the feed chuck 18 is withdrawn. The work is now securely clamped between the draw-in surface 20 of the collet chuck 12.

Figure 2:
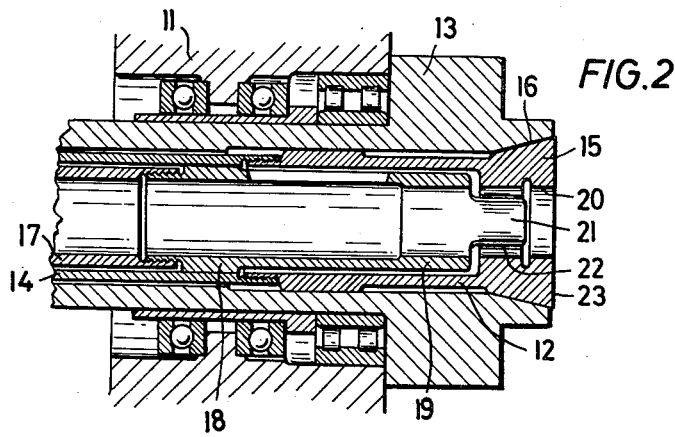
Fig. 2 is a horizontal section.
Figure 3:
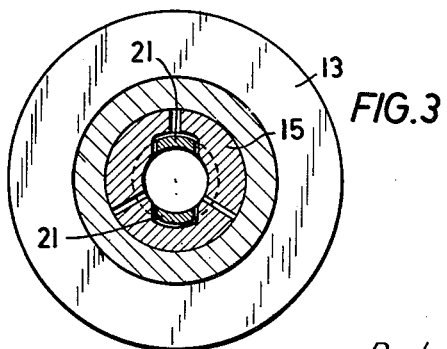
Fig. 3 is a vertical section taken in the plane of the line 3—3 of Fig. 1.

As can clearly be seen in Fig. 2, the feed chuck 18 carries at its front end extensions 21 which in their forward position register with corresponding recesses or pockets 22 in the clamping surface 20 of the collet chuck 12. In the embodiment selected for illustration, two extensions are oppositely arranged. The extensions 21 and the corresponding recesses 22 of the collet chuck do not extend to the front face 23 of the latter. Ahead of the extensions 21, there is a certain length of clamping area available where the last piece of work may be held around its entire circumference, thus providing sufficiently strong clamping in view of the low weight of the last piece.

It is believed that the construction and operation of the device of my invention, as well as the advantages thereof, will be understood from the foregoing detailed description. It is apparent that the jaws of the collet chuck of my device are provided with recesses and that the feed chuck has extensions to engage those recesses from the rear, thus making it possible that long work is held along a portion of the length both by the feed chuck and the collet chuck. I prefer to give the recesses in the jaws of the collet chuck a limited depth, so that they do not extend to the front edge of the collet chuck. Thus, the clamping action of the feed chuck will be sufficiently strong. But the collet chuck, too, will hold the work with sufficient force, considering the shortness and low weight of the last piece of work.

It will also be apparent that while I have shown and described my invention in a single form only, many changes and modifications may be made without departing from the spirit of the invention defined in the following claims.

I claim:

1. Device for automatic lathes to feed and hold rods or similarly shaped work, comprising a feed chuck and a collet chuck, the former chuck extending axially and partly through the latter chuck, the collet chuck having jaws, said jaws being spacedly provided with interior recesses, the feed chuck being provided with extensions to matingly engage the said recesses, the work-gripping surface along a portion of the length of the work being worked on being thus formed both by the feed chuck and the collet chuck.

2. In the device according to claim 1, the extensions engaging the recesses from the rear.

3. In the device according to claim 1, the recesses in the collet chuck jaws being of pocketlike shape.

4. In the device according to claim 1, the recesses ending short of the front face of the collet chuck.

References Cited in the file of this patent

UNITED STATES PATENTS

| | | |
|---|---|---|
| 2,071,138 | Nolan | Feb. 16, 1937 |
| 2,252,840 | Drissner | Aug. 19, 1941 |
| 2,517,908 | Miller | Aug. 8, 1950 |